US009751212B1

(12) United States Patent
Martinson et al.

(10) Patent No.: US 9,751,212 B1
(45) Date of Patent: Sep. 5, 2017

(54) ADAPTING OBJECT HANDOVER FROM ROBOT TO HUMAN USING PERCEPTUAL AFFORDANCES

(71) Applicant: TOYOTA JIDOSHA KABUSHIKI KAISHA, Toyota-shi, Aichi-ken (JP)

(72) Inventors: Eric Martinson, Mountain View, CA (US); David Kim, Mountain View, CA (US); Emrah Akin Sisbot, Mountain View, CA (US); Yusuke Nakano, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/147,901

(22) Filed: May 5, 2016

(51) Int. Cl.
 *G05B 19/18* (2006.01)
 *B25J 9/16* (2006.01)
 *G06N 3/00* (2006.01)

(52) U.S. Cl.
 CPC .............. *B25J 9/163* (2013.01); *G06N 3/008* (2013.01); *Y10S 901/03* (2013.01); *Y10S 901/09* (2013.01)

(58) Field of Classification Search
 CPC ...... G06N 3/008; Y10S 901/03; Y10S 901/09
 See application file for complete search history.

(56) References Cited

U.S. PATENT DOCUMENTS

| 2008/0255911 | A1* | 10/2008 | Khosla | G01S 5/0294 705/7.38 |
| 2014/0080428 | A1* | 3/2014 | Rhoads | G06F 17/30241 455/88 |
| 2014/0149060 | A1* | 5/2014 | Meduna | G06F 1/3206 702/94 |
| 2015/0179219 | A1* | 6/2015 | Gao | G06K 9/00664 386/278 |

OTHER PUBLICATIONS

Cakmak et al., "Human Preferences for Robot-Human Hand-over Configurations," IEEE International Conference on Intelligent Robots and Systems, 2011 (8 pages).
Delaitre et al., "Scene Semantics from Long-Term Observation of People," European Conference on Computer Vision, 2012 (14 pages).

(Continued)

*Primary Examiner* — Ian Jen
(74) *Attorney, Agent, or Firm* — Patent Law Works LLP

(57) ABSTRACT

This disclosure describes, according to some implementations, a system and method for adapting object handover from robot to human using perceptual affordances. In an example method, upon receiving sensor data describing surroundings and/or operational state of a robot unit from a sensor, the method calculates a probability of a perceptual classification based on the sensor data. The perceptual classification may be one or more of an environment classification, an object classification, a human action classification, or an electro-mechanical state classification. The method further calculates an affordance of the probability of the perceptual classifier using a preference model, determines a handover action based on the affordance, executes the handover action, and updates the preference model based on feedback.

19 Claims, 11 Drawing Sheets

(56) References Cited

OTHER PUBLICATIONS

Mainprice et al., "Sharing Effort in Planning Human-Robot Handover Task," The 21st IEEE International Symposium on Robot and Human Interactive Communication, 2012 (7 pages).
Pandey et al., "Affordance Graph a Framework to Encode Perspective Taking," IEEE International Conference on Intelligent Robots and Systems, 2013 (8 pages).
Jiang et al., "Modeling 3D Environments through Hidden Human Context," 2015 (14 pages).
Koppula et al., "Anticipating Human Activities Using Object Affordances," IEEE Transactions on Pattern Analysis and Machine Intelligence, 2016 (8 pages).

* cited by examiner

ADAPTING OBJECT HANDOVER FROM ROBOT TO HUMAN USING PERCEPTUAL AFFORDANCES

BACKGROUND

The specification relates to a robot-human interaction, and as a more specific, non-limiting example, technology for the object handover from robot to human.

In existing approaches, when a robot receives a command to handover an object to a person, the robot executes a predetermined action sequence that hopefully results in the person taking the object from the robot. The robot executes the one executable handover action that was preprogrammed by a designer. In some instances, the parameters of the handover action can be adjusted, but the action itself does not change. In some instances, there are interfaces by which a person can manually identify actions for the robot perform. However, in these instances, the robot is not autonomous—does not switch between actions itself and does not learn when one action should be performed in favor of another.

One approach at improving a robot's handover actions includes defining or identifying human activity by the objects a person is interacting with, and vice versa (e.g., see Hema S. Koppula and Ashutosh Saxena, "Anticipating Human Activities using Object Affordance for Reactive Robotic Response," IEEE Transactions on Pattern Analysis and Machine Intelligence; and Yun Jiang, Hema S. Koppula, and Ashutosh Saxena, "Modeling 3D Environments through Hidden Human Context," in Sexena PAMI 2015). Under this approach, different objects afford different types of human activity, and if those affordances can be learned, then a robot/computer system can identify the human activity from the objects. The above works use conditional random fields to anticipate human activities from a combination of skeletal data and detect objects in relation to the human position. However, reliance on skeletal data is often infeasible or unreliable due to the skeletal information often not being available or a portion of the skeletal information being obscured by other objects.

Another approach focuses on human preferences to modify handover actions (e.g., see M. Cakmak, S. S. Srinivasa, Min Kyung Lee, J. Forlizzi, and S. Kiesler, "Human Preferences for Robot-Human Hand-over Configurations," in Intelligent Robots and Systems (IROS), 2011). This approach emphasizes trajectories, not handover locations. While a trajectory can be helpful for determining handover actions, the location at which the handover action occurs is not evaluated by this approach. Rather, the approach assumes that the handover location is known, which is typically not the case in dynamic environments, and only the person's expectations of how the robot moves need to be matched in order to improve the quality of the handover.

Another approach focuses on determining the location of the handover by combing different affordance data (e.g., see A. K. Pandey, and R. Alami, "Affordance Graph: A Framework to Encode Perspective Taking and Effort Based Affordances for day-to-day Human Robot Interaction," in Intelligent Robots and Systems (IROS), 2013). The emphasis of this approach is on incorporating a reachable area map from the current human position and then adding the perspective of the person and the robot (e.g., the ability of the human and the robot to see that location). The result is an affordance graph, where the effort required to handover the object at each location is estimated through reachability and visibility. This approach however assumes that the person is not going to move significantly from their current location to retrieve the object, which, like the foregoing approach, is typically inapplicable in a true dynamic environment.

Another approach considers the mobility and willingness of a human participant in determining the best location at which to handover the object (e.g., see Jim Mainprice, Mamoun Gharbi, Thierry Sim'eon, and Rachid Alami, "Sharing Effort in Planning Human-Robot Handover Task," in IEEE RO-MAN, Paris France, 2011). This approach considers that if the person is capable of assisting the handover, and doing so either will speed up the process significantly, or can be done with minimal cost to the human, then many individuals would choose to move to meet the robot. However, this approach fails to consider the environments, the human activity, or the object being handed over. Additionally, although people can change their position in order to share the effort in a human robot handover task, they may be otherwise occupied or unwilling to wait for the robot to navigate through a difficult environment.

Therefore, a need exists for a handover action from robot to human that is more autonomous, dynamic, and adaptive in different situations.

SUMMARY

The specification overcomes the deficiencies and limitations of the solutions described in the background section at least in part by providing novel technology for object handover from robot to human using perceptual affordances.

According to one innovative aspect of the subject matter described in this disclosure, a system includes one or more computer processors and one or more memories storing instructions that, when executed by the one or more processors, cause the system to perform operations including: receiving sensor data from a sensor, the sensor data describing surroundings, calculating a probability of a perceptual classification based on the sensor data, calculating an affordance of the probability based on the perceptual classification using a preference model, determining a handover action based on the affordance, executing the handover action, and updating the preference model based on the feedback.

In general, another innovative aspect of the subject matter described in this disclosure may be embodied in methods for executing a handover action that include receiving, using one or more computer processors, sensor data from a sensor, the sensor data describing surroundings; calculating, using the one or more computer processors, a probability of a perceptual classification based on the sensor data; calculating, using the one or more computer processors, an affordance of the probability based on the perceptual classification using a preference model; determining, using the one or more computer processors, a handover action based on the affordance; executing, using the one or more computer processors, the handover action; and updating, using the one or more computer processors, the preference model based on feedback.

Other aspects include corresponding methods, systems, apparatus, and computer program products for these and other innovative aspects.

These and other implementations may each optionally include one or more of the following features and/or operations. For instance, the features and/or operations include: extracting object data from the sensor data; determining an object trait based on the object data; determining an object classification based on the object trait; calculating a probability of the object classification; extracting environment data from the sensor data; determining an environment classification based on the environment data; calculating a probability using the environment classification; extracting a human activity based on the activity data; determining a human activity classification based on the human activity; calculating a probability using the human activity classification; extracting state data from the sensor data; determining a state based on the state data; determining an electro-mechanical state classification based on the state; calculating a probability using the electro-mechanical state classification; monitoring the executed handover action; determining a success of the handover action; determining an indirect feedback based on the success; updating the preference model using the indirect feedback; requesting a direct feedback from a user; updating the preference model using the direct feedback; the environment data is a geolocation; and that calculating the probability of the perceptual classification based on the sensor data includes calculating a first probability for an object classification, calculating a second probability for a human activity, calculating a third probability for an environment, and calculating a fourth probability for an electro-mechanical state classification, and calculating the affordance based on the first probability, the second probability, the third probability, and the fourth probability.

The technology is particularly advantageous because a robot unit can utilize affordances piecemeal to make handover decisions. The robot unit is able to perform handover actions using advanced decision-making by gathering data from the surroundings and using different affordances to determine different handover actions. Further, by receiving direct and/or indirect feedback from a user, the robot unit is able to learn individual preferences.

It should be understood that the foregoing advantages are provided by way of example and that the technology may have numerous other advantages and benefits.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
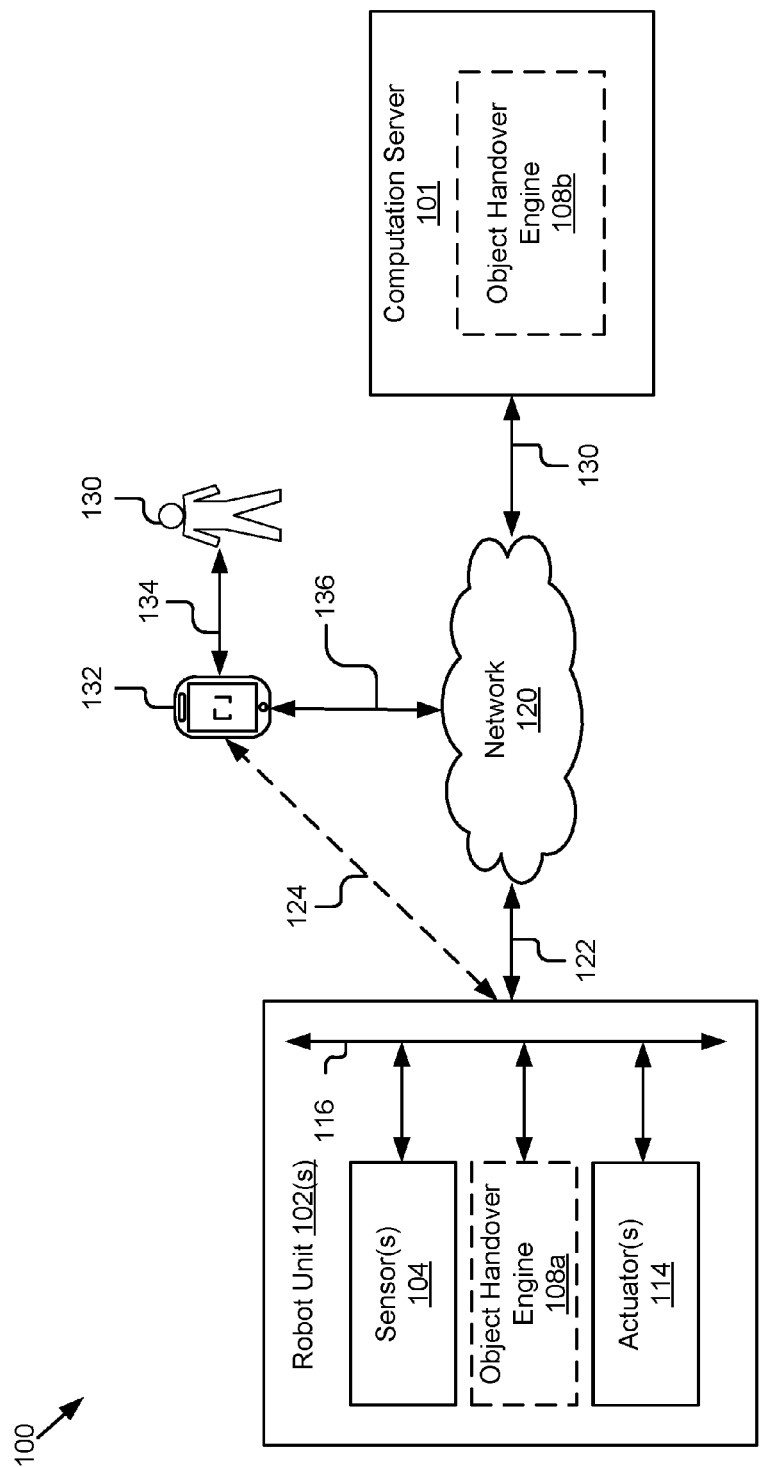
FIG. 1 is a block diagram illustrating an example object handover system.

This document discloses technology for adapting object handover from robot to human using perceptual affordances. The technology may include an example object handover system 100, as shown in FIG. 1. The system 100 may include any number of robot units 102. A robot unit 102 may be wirelessly coupled to a network 120 for communication with the other entities of the system 100, as reflected by signal line 122. The system 100 may further include a client device 132, which may be communicatively coupled to the network 120, as reflected by signal line 136. In some implementations, the client device 132 may additionally and/or alternatively be coupled directly to the robot unit 102 via signal line 124, such as via a wireless and/or wired connection. User 130 may be a human waiting to receive an object, and the user 130 may interact with the client device 132 via input and output devices, as reflected by line 134. The system 100 may further include a computation server 101, which may be commutatively coupled to the network 120, as reflected by single line 130.

Figure 6:
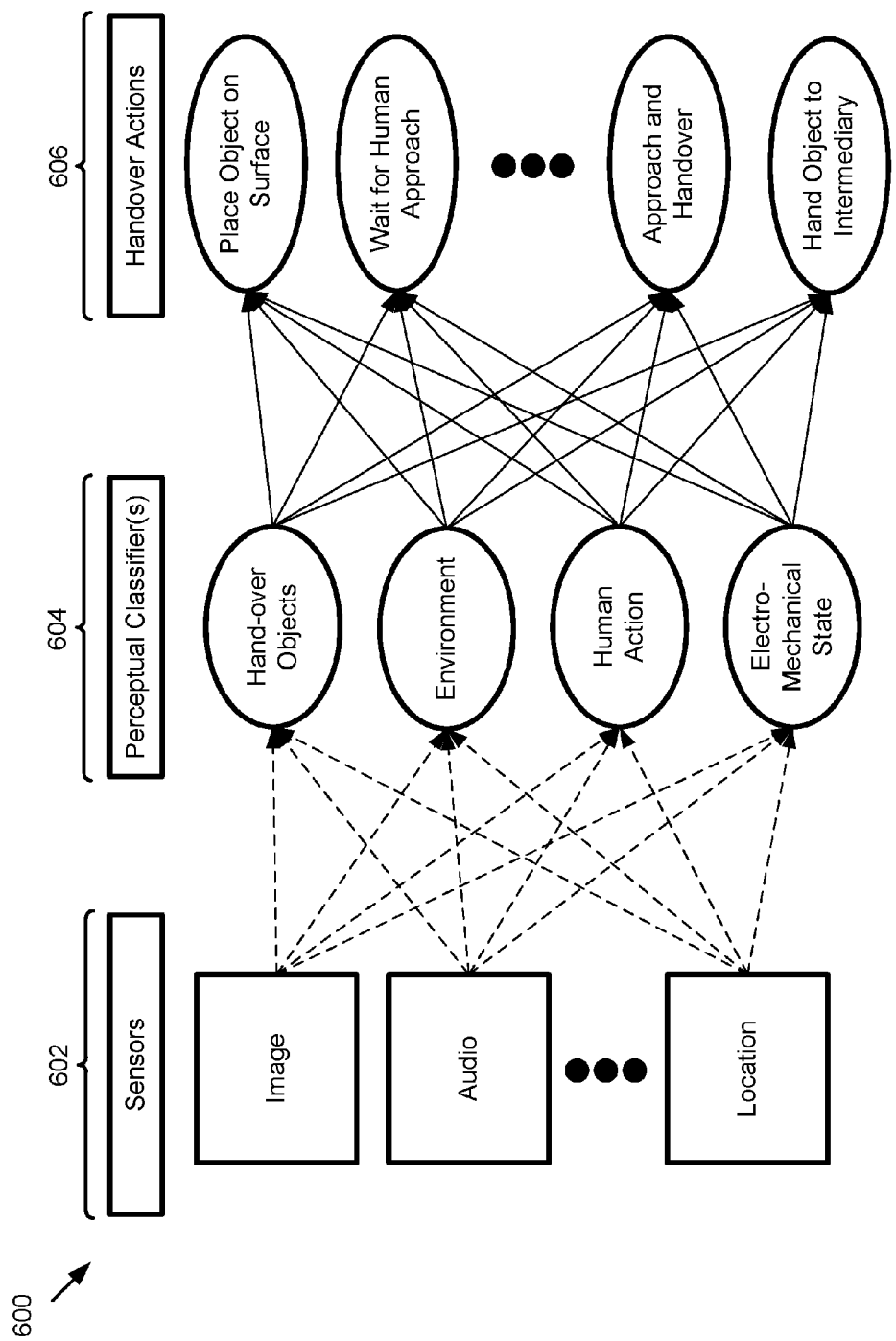
FIG. 6 is a high-level diagram illustrating an example object handover system.

In an example implementation, a robot unit 102 may be holding an object that the robot unit 102 may be configured to pass to a human using a handover action. The robot unit 102 gathers data using sensor(s) 104, classifies the data collected by the sensor(s) 104 to determine available affordances, and performs a calculated handover action based on the affordances. FIG. 6 illustrates a diagram of an example process 600 for determining a handover action.

A handover action may be any action performed by a robot unit 102 to pass an object directly or indirectly to a user 130. In some implementations, the handover actions 606 performed by the robot unit 102 may include, placing an object on a surface for a user 130 to move to and pick up, waiting with the object for a user 130 to move to and pick up, approaching a user 130 with the object and handing the object to the user 130, or handing the object to an intermediary and having the intermediary hand the object to the user 130.

A robot unit 102 may determine which handover actions 606 to perform in a specific situation based on perceptual classifier(s) 604 executed by the robot unit 102. The perceptual classifier(s) 604 may calculate probabilities for different classifications based on data received from the sensors 602. The different probabilities may be used to determine different affordances that may be taken based on the surroundings and/or operational state of the robot unit 102. An affordance is a potential action that the robot unit 102 may execute based on the surroundings and/or operational state of the robot unit 102.

A robot unit 102 may collect sensor data using the sensors 602 reflecting the surroundings and/or operational state of the robot unit 102, such as images of the environment, audio of environment, location data (such as a geolocation), operational data of the robot unit 102, etc.

The data collected from the sensors 602 may be processed by one or more of the perceptual classifier(s) 604 to determine one or more probabilities associated with one or more classifications, respectively. For example, as shown in FIG. 6, the perceptual classifier(s) 604 may include an object perceptual classifier for estimating the type of object that is being handed over (e.g., ball, etc.) based on image data of the object and weight data of the object, etc.; an environment perceptual classifier for estimating the environment (e.g., a hallway/laboratory with no immediate obstructions, etc.) based on image data of the environment, audio data of the environment, location data identifying where the environment is located (e.g., with reference to known locations), etc.; a human action perceptual classifier for estimating the human's state (e.g., standing, moving, busy performing an action, etc.) using image data of the user, audio data of the user, etc.; and/or an electro-mechanical state perceptual classifier for estimating the state of the robot unit 102 (e.g., low battery power, level of success or failure of previous attempts, etc.) using corresponding sensor data (e.g., battery state data, input data from prior interactions, etc.).

The robot unit 102 is able to calculate various handover actions 606 using the output of the perceptual classifiers(s) 604. These handover actions 606 may perform a wide-range of tasks in various situations. The following non-limiting examples are provided for further understanding. In a first scenario, the robot unit 102 determines that the environment is cluttered; making movement by the robot unit 102 difficult. In response to estimating the environment is cluttered, the robot unit 102 may place an object on a surface where the human can move to pick it up. In a second scenario, the robot unit 102 may determine that the environment is cluttered and that the object is round. As a result, rather than setting the object down where the object would roll away, the robot unit 102 will hold the object, wait for the human to approach, and directly handover the object. In a third scenario, the robot unit 102 may determine that the environment is open and navigable, and the robot unit 102 may move to the human and handover the object. In a fourth scenario, the robot unit 102 may determine that an intermediary (e.g. another human, another robot unit, etc.) capable of finishing the handover action 606 is present in the environment, and the robot unit 102 may move to the intermediary and pass the object to the intermediary. In some implementations, the robot unit 102 may receive direct and/or indirect feedback during/after the handover action to personalize subsequent handover actions for individual preferences, as discussed in further detail elsewhere herein.

Referring again to FIG. 1, as illustrated, a robot unit 102 may include one or more sensor(s) 104, an instance of the object handover engine 108, labeled 108a, and one or more actuator(s) 114. The sensor(s) 104, the object handover engine 108a, and the actuator(s) 114 may be coupled together by a communication bus 116. It should be understood that the robot unit 102 may include additional and/or fewer components, such as an operating system, other software, input and/or output device, actuator controllers, housings, other mechanical and/or electrical components often used in robotics, etc.

The sensor(s) 104 may also include sensing device(s) that are capable of detecting the state of the robot unit 102, its components, and/or its environment. Non-limiting example sensing device(s) include a gyroscope, accelerometer, thermocouple, touch sensor, weight sensor, proximity sensor, light sensor, 2D camera, 3D camera, time of flight (TOF) camera, stereo camera, sound sensor (microphone), pressure sensor, etc. Other types of sensors are also contemplated.

The object handover engine 108, reflected in FIG. 1 as instances 108a and/or 108b, is operable to compute object handover from the robot unit 102 to the user 130 using perceptual affordances. The object handover engine 108 is discussed in further detail elsewhere herein, such as with reference to at least FIGS. 2A-6.

The actuator(s) 114 include mechanical and/or electrical devices that are capable of converting energy into motion. The actuator(s) 114 may be electric, pneumatic, hydraulic, magnetic, mechanical, and/or magnetic, and/or a combination of the foregoing. Non-limiting example actuator(s) 114 include electric motors, servomechanism, hydraulic cylinders, pneumatic actuators, corresponding gearing, connectors, and kinematic components, etc. The actuator(s) 114 may include an actuator controller for controlling the actuator(s) 114 of the robot unit 102. For example, the actuator controller may send signals (e.g., motion commands, calibration commands, etc.) to the actuator(s) 114 to controls the movement or state of the robot unit 102, including the direction and speed of the robot unit 102 itself and/or its appendages and components. The actuator controller may also send signals (e.g., motion commands, calibration commands, etc.) to the actuator(s) 114 to perform handover actions using the appendages of the robot unit 102. The actuator controller may be comprised of hardware, software, and/or a combination of the foregoing. For example, the actuator controller may comprise standard computer circuitry, firmware, etc., for controlling actuator(s) 114. In some implementations, the actuator controller may be integrated with a processor, such as processor(s) 202 depicted in FIG. 2A, or may be distinct from but coupled to the processor(s) 202 via the bus 116.

The components of the robot unit 102 are communicatively coupled via the bus 116, which is discussed in further detail with reference to at least FIG. 2A.

The computation server 101 includes computer hardware and software having data processing, storing, and communication capabilities, as discussed elsewhere herein. For example, the computation server 101 may include one or more hardware servers, server arrays, storage devices and/or systems, etc. In some implementations, the computational server 101 may include one or more virtual servers, which operate in a host server environment. As depicted, the computation server 101 may include an instance of the object handover engine 108, labeled 108b, which is discussed in further detail elsewhere herein.

Figure 2A:
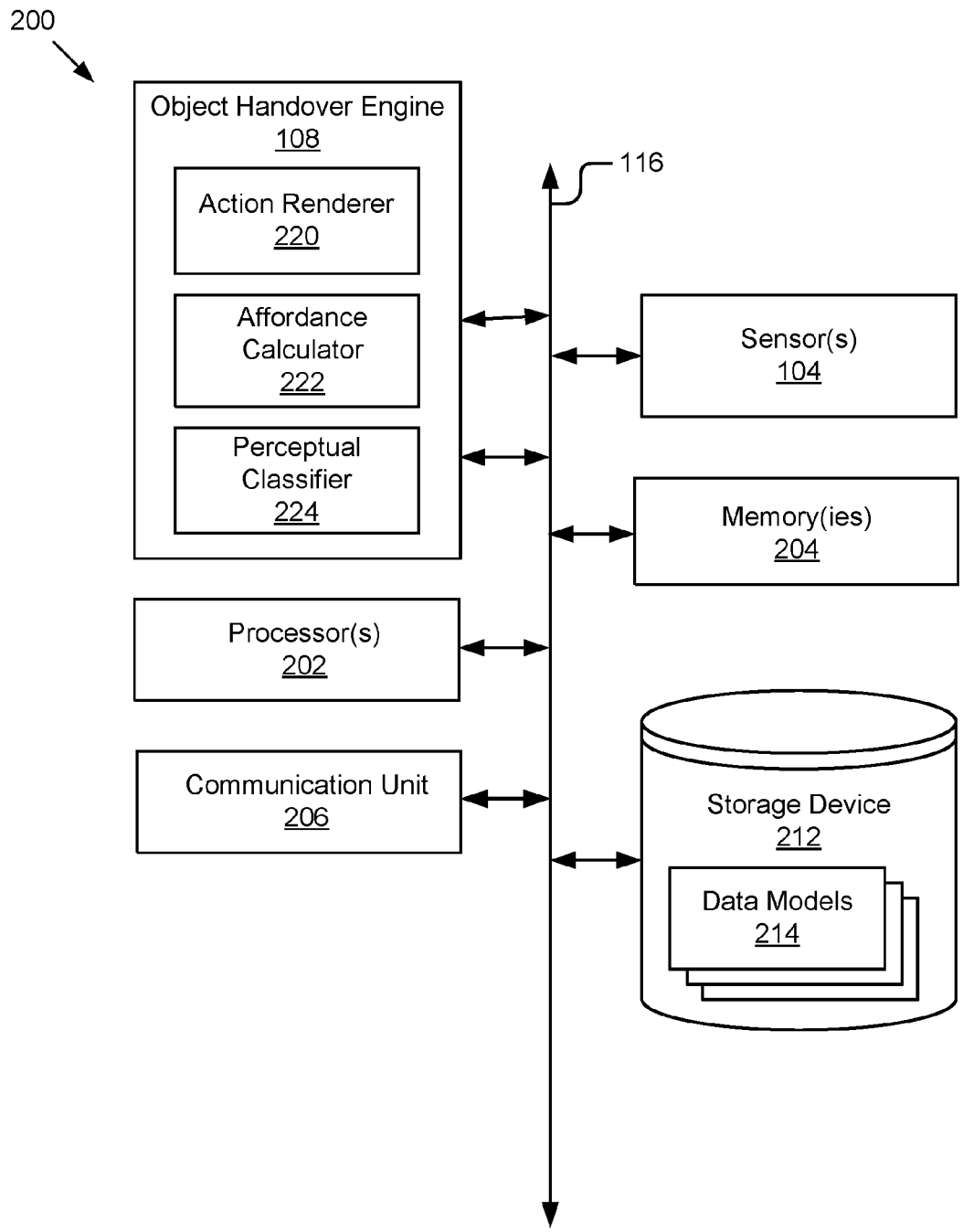
FIG. 2A is a block diagram of an example computing device.

FIG. 2A is a block diagram of an example computing device 200. As depicted, the computing device 200 may include processor(s) 202, memory(ies) 204, a communication unit 206, sensor(s) 104, object handover engine 108, and/or a storage device 212, which may be communicatively coupled by a standard communication bus 116. The computing device 200 depicted in FIG. 2A is provided as an example and it should be understood that it may take other forms and include additional or fewer components without departing from the scope of the present disclosure, such as the components of the robot unit 102 depicted in FIG. 1 (e.g., if reflecting the architecture of a robot unit 102), standard input and output devices (e.g., pointer devices, keyboards, displays, cameras, microphones, etc.) for inputting commands, human-computer interaction, and/or receiving notifications, etc., and/or any other suitable computer components, etc.

The processor(s) 202 may execute instructions by performing various input/output operations, logical operations, and/or mathematical operations. The processor(s) 202 may have various known computing architectures to process data signals. The processor(s) 202 may be physical and/or virtual, and may include a single processing unit or a plurality of processing units. In some implementations, the processor(s) 202 may be capable of generating and providing electronic display signals to a display device (not shown), supporting the display of images, capturing and transmitting images, performing complex tasks including various types of feature extraction and sampling, etc. In some implementations, the processor(s) 202 may be coupled to the memory(ies) 204 via the bus 116 to access data and instructions therefrom and store data therein. The bus 116 may couple the processor(s) 202 to one or more other components including, for example, the memory(ies) 204, the sensor(s) 104, the communication unit 206, the storage device 212, etc. It should be understood that the processor(s) 202 may be a single device or may include multiple types of devices and configurations.

The memory(ies) 204 may store and provide access to data to the other components of the computing device 200. In some implementations, the memory(ies) 204 may store instructions and/or data that may be executed by the processor(s) 202. For instance, the memory(ies) 204 may store the object handover engine 108 and/or components thereof. The memory(ies) 204 may also be capable of storing other instructions and data, including, for example, an operating system, hardware drivers, other software applications, databases, etc. The memory(ies) 204 may be coupled to the bus 116 for communication with the processor(s) 202 and the other components of the computing device 200.

The memory(ies) 204 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor(s) 202. In some implementations, the memory(ies) 204 may include one or more of volatile memory and non-volatile memory. For example, the memory(ies) 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 204 may be a single device or may include multiple types of devices and configurations.

The communication unit 206 may include one or more interface devices for wired and/or wireless connectivity with the network 120, as reflected by signal line 122, and the other components of the system 100. For instance, the communication unit 206 may include, but is not limited to, wireless transceivers for sending and receiving signals using Wi-Fi™; Bluetooth®, near-field communication (NFC), cellular communications, etc.; CAT-type interfaces; USB interfaces; various combinations thereof; etc. The communication unit 206 may be coupled to the other components of the computing device 200 via the bus 116. The communication unit 206 may communicate using various standard communication protocols, including, for example, those discussed elsewhere herein.

The bus 116 may include a communication bus for transferring data between components of a computing system or between computing systems, a network bus system including the network 102 and/or portions thereof, a processor mesh, a combination thereof, etc. In some implementations, the bus 116 may represent one or more buses including an industry standard architecture (ISA) bus, a peripheral component interconnect (PCI) bus, a universal serial bus (USB), or some other bus known to provide similar functionality. Additionally and/or alternatively, the various components of the computing device 200 may cooperate and communicate via a software communication mechanism implemented in association with the bus 116. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The storage device 212 is an information source for storing and providing access to data. The data stored by the storage device 212 may be organized and queried using various criteria including organizing into data models 214. The data models 214 may include data and algorithms for executing handover actions using perceptual affordances, for example, preference models, object models, environment models, human action models, state models, object handover models, etc. These models may be predetermined, or determined and/or further learned by the object handover engine 108. Examples of the types of data stored by the storage device 212 as data models 214 may include data tables, databases, or other organized collections of data discussed elsewhere herein.

The storage device 212 may be included in the robot unit 102 or in another computing system and/or storage system distinct from but coupled to or accessible by the robot unit 102. The storage device 212 includes one or more non-transitory computer-readable media for storing the data. In some implementations, the storage device 212 may be incorporated with the memory(ies) 204 or may be distinct therefrom. In some implementations, the storage device 212 may store data associated with a database management system (DBMS) operable on the robot unit 102. For example, the DBMS could include a structured query language (SQL) DBMS, a NoSQL DMB S, a file system, flat files, various combinations thereof, etc. In some instances, the DBMS may store data in multi-dimensional tables comprised of rows and columns, and manipulate, e.g., insert, query, update and/or delete, rows of data using programmatic operations.

The object handover engine 108 includes computer logic executable to calculate and execute handoff operations. The computer logic may be implemented in software, hardware, and/or a combination of the foregoing as one with skill in the art would understand. For example, the object handover engine 108 may program the processor(s) 202 to perform the operations discussed herein. For instance, the object handover engine 108's software routines may be stored in the memory(ies) 204, and retrieved and executed by the processor(s) 202. In another example, the object handover engine 108 may include circuitry implemented by the processor(s) 202 to perform the acts and/or functionality discussed herein. Non-limiting examples of circuitry include a field-programmable gate array (FPGA), an application-specific integrated circuit (ASIC), wiring, standard electronic components, boards, and/or other suitable circuitry, etc.

This document sometimes refers to the object handover engine 108, and/or its subcomponents, as the actor (in the third person) for convenience and so as not to obscure the various operations carried out by them. However, it should be understood that these elements are logic executable by the processor(s) 202, program the processor(s) 202, etc., to perform the specific operations described herein.

As depicted in FIG. 2A, the object handover engine 108 may include various subcomponents, such as an action renderer 220, an affordance calculator 222, and/or a perceptual classifier 224, although it should be understand that one or more of these components may take different forms, may be consolidated together and/or divided into further components, without departing from the scope of this disclosure. The object handover engine 108 depicted in FIG. 2A is provided as an example and it should be understand that it may take other forms and include additional or fewer components without departing from the scope of the present disclosure. For instance, in some configurations, the object handover engine 108, or various aspects thereof, may be distributed over the network 120 on disparate devices in disparate locations or all the functionality of the object handover engine 108 may be resident code operable by a single computing device or group of related devices. Other configurations are also possible and contemplated.

The action renderer 220 includes computer logic operable to execute various actions based on affordance-related data. Affordance-related data is data describing one or more actions that may be taken by a robot unit 102, as discussed elsewhere herein. In an example, the action renderer 220 may render a handover action to pass an object in the control of a robot unit 102 to a user 130. The action renderer 220 may be coupled to the affordance calculator 222 and/or a data store to receive the affordance-related data. By way of example and not limitation, the action renderer 220 may be executed by making a procedure call, calling an object-oriented method, or invoking another suitable process. For instance, a main program of the object handover engine 108, the affordance calculator 222, an external or internal API, or another component, may instantiate the action renderer 220, although other execution paths are also applicable and contemplated.

In some implementations, the action renderer 220 is adapted for cooperation and communication with the processor(s) 202, the memory(ies) 204 and other components of the example computing device 200 via the bus 116. The action renderer 220 may store data and commands received during the execution of a handover action in the memory(ies) 204 and/or storage device 212. The action renderer 220 may be coupled to output device(s) to output information to a user 130 and/or other objects in the surroundings. The action renderer 220 may be coupled to input device(s) to receive information from a user 130 and/or other objects in the surroundings. The action renderer 220 may be coupled to the actuator controller for controlling the actuators 114 as discussed elsewhere, herein.

The affordance calculator 222 includes computer logic operable to estimate various affordances based on perceptual classifier-related data. Perceptual classifier-related data is data describing classifications of information of the surroundings and/or operational state of the robot unit 102, as discussed elsewhere herein. In an example, the affordance calculator 222 may estimate an affordance(s) using one or more classification(s) of the surroundings and/or handover object(s), and pass the affordance(s) on to the action renderer 220 as affordance-related data.

The affordance calculator 222 may be coupled to the perceptual classifier 224, the action renderer 220, and/or a data store to send and receive data, such as perceptual classifier-related data. By way of example and not limitation, the affordance calculator 222 may be executed by making a procedure call, calling an object-oriented method, or invoking another suitable process. For instance, a main program of the object handover engine 108, the perceptual classifier 224, an internal or external API, or another component, may instantiate the affordance calculator 222, although other execution paths are also applicable and contemplated.

In some implementations, the affordance calculator 222 is adapted for cooperation and communication with the processor(s) 202, the memory(ies) 204 and other components of the example computing device 200 via the bus 116. The affordance calculator 222 may store data and commands received during the estimation of affordances in the memory(ies) 204 and/or storage device(s) 212. The affordance calculator 222 may be coupled to output device(s) to output information. The affordance calculator 222 may be coupled to input device(s) to receive input, such as feedback, from a user 130 and store the input in the memory(ies) 204 and/or storage device(s) 212. The affordance calculator 222 may be coupled to the sensor(s) 104 to receive data of the surroundings during the execution of a handover action by the action renderer 220 and store the received data in the memory(ies) 204 and/or storage device(s) 212.

The perceptual classifier 224 includes computer logic operable to estimate various perceptual classifications based on sensor data received from the sensor(s) 104. Sensor data is data captured by sensors(s) 104 of the surroundings and/or operational state of the robot unit 102, as discussed elsewhere herein. In an example, the perceptual classifier 224 may estimate a perceptual classification using sensor data of the surroundings and pass the perceptual classification on to the affordance calculator 222 as perceptual classification-related data.

The perceptual classifier 224 may be coupled to the affordance calculator 222, the sensor(s) 104, and/or a data store to receive the sensor data. By way of example and not limitation, the perceptual classifier 224 may be executed by making a procedure call, calling an object-oriented method, or invoking another suitable process. For instance, a main program of the object handover engine 108, the sensor(s) 104, an internal or external API, or another component, may instantiate the perceptual classifier 224, although other execution paths are also applicable and contemplated.

In some implementations, the perceptual classifier 224 is adapted for cooperation and communication with the processor(s) 202, the memory(ies) 204 and other components of the example computing device 200 via the bus 116. The perceptual classifier 224 may store data and commands received during the estimation of affordances in the memory(ies) 204 and/or storage device(s) 212. The perceptual classifier 224 may be coupled to output device(s) to output information. The perceptual classifier 224 may be coupled to input device(s) to receive input, such as feedback, from a user 130 and store the input in the memory(ies) 204 and/or storage device(s) 212. The perceptual classifier 224 may include one or more specific classifiers as described with reference to at least FIG. 2B.

Figure 2B:
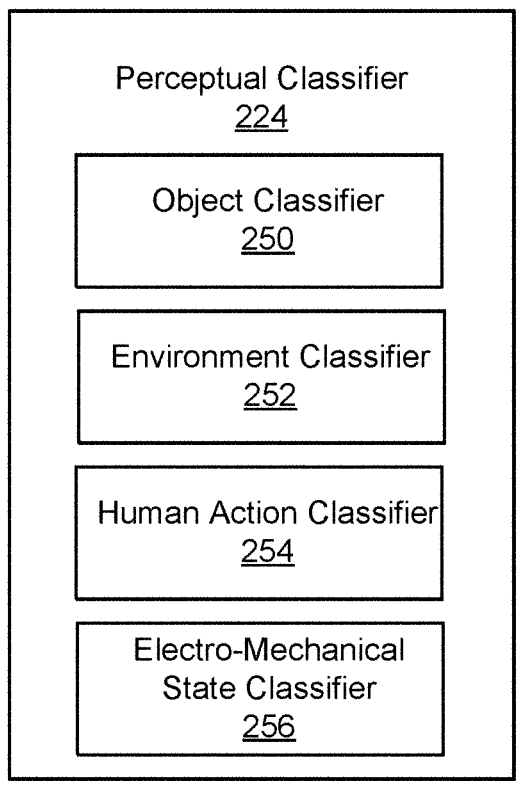
FIG. 2B is a block diagram of an example perceptual classifier.

FIG. 2B is a block diagram of an example perceptual classifier. The perceptual classifier 224 may include one or more of, an object classifier 250, an environment classifier 252, a human action classifier 254, and/or an electro-mechanical state classifier 256. The classifiers 250, 252, 254, and/or 256 may be adapted for cooperation and communication with the processor(s) 202, the memory(ies) 205, and other components of the example computing device 200. The classifiers 250, 252, 254, and/or 256 may be executed in a manner similar to those discussed above with reference to the other components of the object handover engine 108.

The object classifier 250 may use the sensor data provided by sensor(s) 104 to determine object data of an object being manipulated in a handover action. The object classifier 250 may use the object data described and/or extracted from sensor data provided by the sensor(s) 104 to determine one or more object classifications and calculate corresponding probabilities of the object belonging to those classification(s), respectively. The environment classifier 252 may use the environment data described and/or extracted from sensor data provided by sensor(s) 104 to determine one or more environment classifications and calculate corresponding probabilities of an environment belonging to those classifications, respectively. The human action classifier 254 may use the activity data described and/or extracted from sensor data provided by sensor(s) 104 to classify one or more human activity(ies) being performed by a user 130 and calculate corresponding probabilities of the human activity(ies) belonging to those classifications, respectively. The electro-mechanical state classifier 256 may use the state data described and/or extracted from sensor data provided by sensor(s) 104 to determine one or more state classifications and calculate corresponding probabilities of the state(s) belonging to those classifications, respectively. These components are described in further detail below with reference to at least FIGS. 3 and 4A-4E.

Figure 3:
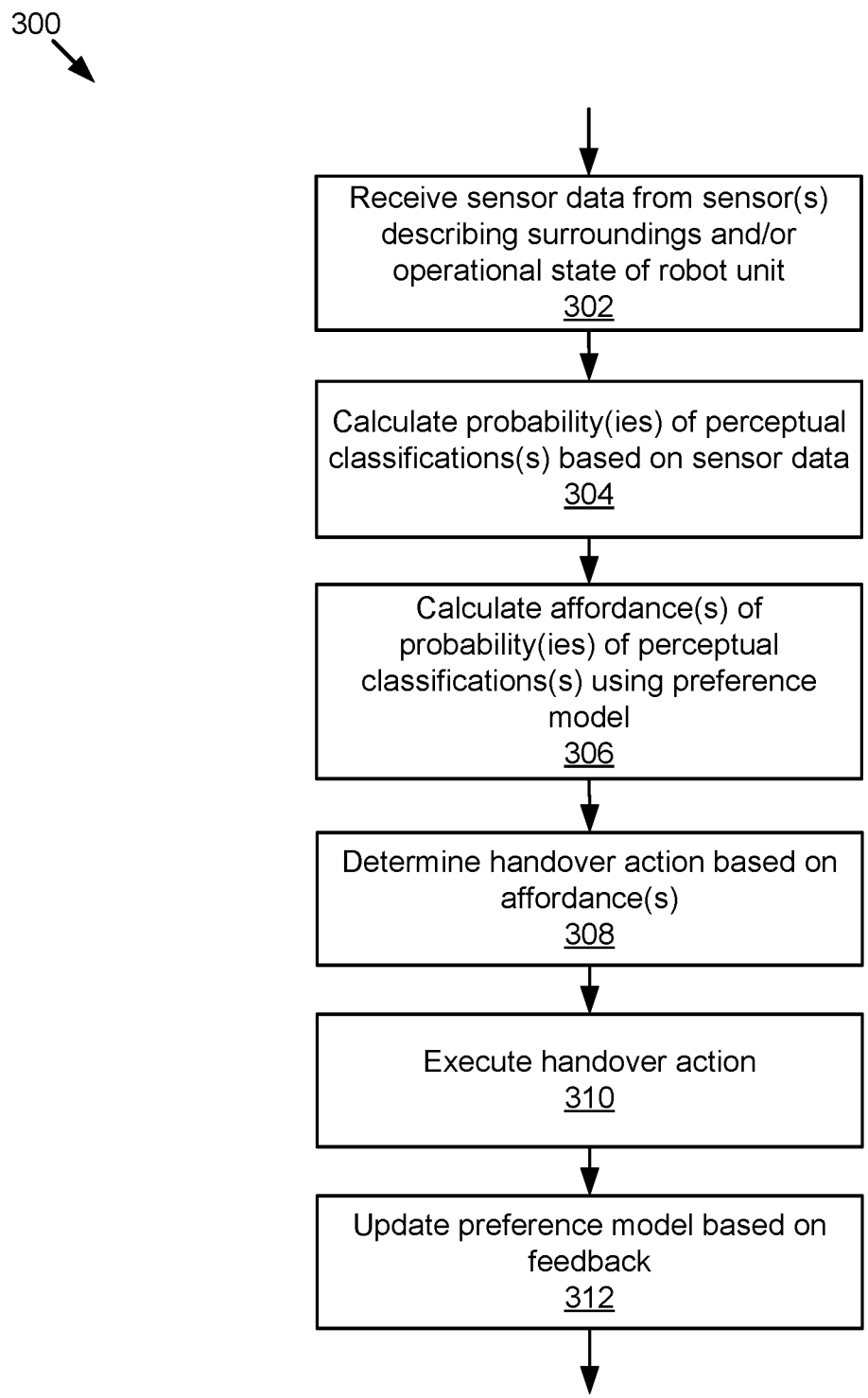
FIG. 3 is a flowchart of an example method for performing object handover from robot to human.

FIG. 3 is a flowchart of an example method 300 for determining an object handover from a robot unit 102 to user 130 using perceptual classifiers, executing the object handover, and updating a preference model. At block 302, the perceptual classifier 224 receives sensor data from sensor(s) 104 describing surroundings and/or operation state of the robot unit 102. The sensor data may include data related to the surrounding environment, the characteristics of an object (e.g., weight, shape, packaging, quantity, etc.), the activities and actions of the user 130, and/or the state of the robot unit 102 (e.g., power level, previous success of operations, etc.), etc. For example, in some implementations, the sensor(s) 104 may include a weight sensor used by the robot unit 102 to determine a weight of an object, a camera sensor used by the robot unit 102 to capture information of the surrounding environment and the user 130, and a geolocation sensor used by the robot unit 102 to determine location data.

At block 304, the perceptual classifier 224 determines handover-related classification(s) and corresponding probability(ies) based on the sensor data. The perceptual classifier 224 determines the classification(s) ($C_i$) and probability(ies) associated with those classification(s) using the sensor data. The perceptual classification(s) ($C_i$) describe aspects that can exist/occur, and the probability(ies) reflect the chance of that aspect existing/occurring given the sensor data (S). The classification(s) may classify different objects, environments, human actions, and/or electro-mechanical states, as described in more detail with reference to FIGS. 4A-4E. For example, the perceptual classifier 224 may estimate a perceptual classification(s) for the probability (P) of an environment using $P(C_{environment}|S_{Image}, S_{Audio}, S_{Location} \ldots )$, and this probability reflects the likelihood of any particular environment occurring (living room, bedroom, kitchen, etc.) given the sensor data. For instance, as shown in the following Table 1 and Table 2 below, an environment classification(s) estimates the different probabilities that the environment is a specific location. In table 1, two different locations (e.g., kitchenette and kitchen) have very similar probabilities and the perceptual classifier 224 may have rules to determine which location to provide to the affordance calculator 222. In further implementations, the perceptual classifier 224 may provide multiple locations with similar probabilities to the affordance calculator 222. In table 2, the corridor location has a relatively higher probability than the other locations and the perceptual classifier 224 may provide the corridor location to the affordance calculator 222.

TABLE 1

| Location Image #1 | Probability |
|---|---|
| Kitchenette | 32.64% |
| Kitchen | 31.74% |
| Gallery | 5.33% |
| Dining Room | 4.79% |
| Office | 3.0% |

TABLE 2

| Location Image #2 | Probability |
|---|---|
| Corridor | 70.97% |
| Office | 13.15% |
| Lobby | 5.24% |
| Basement | 2.98% |
| Reception | 2.12% |

With reference to the example discussed at block 302, the perceptual classifier 224 may receive the weight sensor data, camera data, and geolocation data from the sensors. The perceptual classifier 224 may classify, with a certain probability using the weight reflected by the weight sensor data and/or a size and shape reflected by image analysis on the camera data, the object as a steel box. The perceptual classifier 224 may perform image analysis on the camera data to determine the shape, size, location, coloration, and/or other aspects of the object as well as locate the user 130 in the images. The perceptual classifier 224 may estimate the user 130 is engaged in a specific activity using the camera data (e.g., laying down, walking, running, leaning on an object, conversing with another person, etc.). The perceptual classifier 224 may use the location data from one or more geolocation sensors and/or a multi-dimensional image data (e.g., stereo image, etc.) from one or more image sensors to estimate the robot unit 102's location and/or the user's location. For example, the multi-dimensional image data may reflect the special coordinates of the user (object that matches the characteristics of a human) within a scanned environment and GPS data and/or other micro-location data may reflect the positional coordinates of the robot unit 102. Further, using standard scene detection techniques, the perceptual classifier 224 may classify, with a certain probability using image data and/or other data, the scene as being a certain room type (e.g., a laboratory, etc.)

At block 306, the affordance calculator 222 calculates affordance(s) based on the probability(ies) of the classification(s) computed by the perceptual classifier 224 using a preference model. An affordance may be a relationship between the robot unit 102 and a situation determined based on the output of the perceptual classifier 224. In some implementations, an affordance may be a possibility of a handover action (H) based on the surroundings and/or operational state of the robot unit 102. For example, an environment classification ($C_{environment}$) may have a probability that the environment is cluttered and the robot unit will have difficulty navigating the clutter. The affordance calculator 222 may calculate probabilities for a set of actions based on the environment classification ($C_{environment}$), and select the handover action with the highest probability, as described by $P(H_{place\_object\_on\_surface}|C_{environment})$. For example, rather than moving to the user 130 (which has a relatively lower probability), the robot unit 102 is directed to place the object to be handed-over on a surface (which has a relatively higher probability).

In a further example, an environment classification may have a probability that the robot unit 102 is in a hallway with a user 130, and an affordance may have a probability such that the robot unit 102 is directed to the end of the hallway where the user 130 is positioned, as reflected by $P(H_{move\_down\_hallway}|C_{human\_action})$.

The affordance calculator 222 may determine affordance(s) using a preference model. A preference model is a model used for selecting different handover actions in response to different conditions. In some implementations, the preference model includes pre-defined/default values for different affordances and/or values that are learned using machine learning, such as a Bayesian network or other suitable algorithm. For instance, the affordance calculator may adapt the affordance values in a preference model using feedback from one or more users 130. In particular, if the robot unit 102 takes an action that is inapplicable or less suitable for a given situation, the user may input feedback about that action (e.g., by interacting with a input device), which the affordance calculator 222 may interpret and use to augment one or more affordance values. In some cases, different preference models may be stored for each user or segment of users, and adapted and/or customized to those users over time.

Multiple methods may be available for setting values of different affordances in the preference model. In some implementations, a generic affordance may use a study-based approach whereby a large number of users 130 are invited to interact with the robot unit 102 and provide feedback on how well the robot unit 102 performs various actions. The feedback may be provided in the form of a questionnaire or alternative methods of receiving information. The results of the feedback may be used to build a generic model of P(H|C) for all combinations of handover actions (H) and classifiers (C). A generic affordance represents social and cultural norms of the spectrum of users 130 sampled. In these or other implementations, the affordance calculator 222 sets the preference model values for different affordances using direct human feedback or indirect human feedback, as is described in more detail with reference to at least FIG. 5.

With reference to the example discussed above with reference to blocks 302 and 304, the affordance calculator 222 may receive the estimated classifications from the perceptual classifier 224 that the object is a steel box, the user is engaged in a specific activity (e.g., sitting at a desk), and the environment is a laboratory. The affordance calculator 222 may use these classifications to estimate multiple affordances the robot unit 102 could perform and/or affordances the robot unit 102 is incapable of performing based on the classifications. In the example, affordances the robot could perform include: moving along an unobstructed pathway in the laboratory, setting the object down on a counter, moving the steel box to another location such as a storage closet, etc. In a further example, based on the weight of the object, the affordance calculator may assign a lower score to handing over the object directly to the user because the weight of the object exceeds a threshold value of what the user 130 may be capable of handling (which may have been determined based on previous feedback received from the user 130, a predefined setting, etc.).

At block 308, the affordance calculator 222 determines one or more handover action(s) based on the affordance(s) it calculates. An affordance may reflect a single action to be taken by the robot unit 102 or may reflect a portion of an overall handover sequence (e.g., series of actions) that should be rendered. In the latter case, a set of affordances may collectively define the handover action/sequence (hereafter simply referred to as handover action). In some implementations, a sequence may include a navigational portion(s) in which the robot unit 102 is navigated toward the user and/or an intermediary object (e.g., table, floor, other person, other robot unit 102, etc.), and a handoff portion in which the robot unit 102 relays the object to the user and/or intermediary object. The affordance calculator 222 may determine the one or more affordances comprising a handover action based on the perceptual environment classifiers, object perceptual classifiers, human action perceptual classifiers, and/or electro-mechanical state perceptual classifiers discussed elsewhere herein. With reference to the example discussed at blocks 302, 304, and 306, the affordance calculator 222 may estimate, using the affordances the robot unit 102 could and/or could/should not perform to identify a series of affordances that would accomplish the handover action. For instance, the affordance calculator 222 may estimate that the robot unit 102 can move toward the desk the user 130 is sitting at and set the steel box down on the desk near the user 130.

At block 310, the action renderer 220 executes the handover action. Once the affordance calculator 222 determines the handover action, the action renderer 220 executes the handover action. The action renderer 220 executes the handover action by controlling the actuators 114 of the robot unit 102. In some implementations, the object handover engine 108 may also monitor the surroundings and/or operational state of the robot unit 102 using the sensor(s) 104 while the action renderer 220 executes the handover action and store the monitored data for indirect feedback. In some implementations, the action renderer 220 converts the handover action or sequence of actions into signals that may be sent to the actuator controller for controlling the actuators 114. With reference to the example discussed at blocks 302, 304, 306, and 308, the action renderer 220 may convert the steps of moving the robot unit 102 to the user 130's desk and setting the steel box down into signals that may be sent to the actuator controller. The actuator controller may process those signals and interact with the actuators 114 to perform the two commands.

At block 312, the affordance calculator 222 updates the preference model based on feedback. The feedback may be generic feedback received as described above from reviews received from a large number of users 130. In further implementations, the feedback may be direct feedback received from the specific user 130 that received the object as part of the handover action as described in more detail with respect to at least FIG. 5. In further implementations, the affordance calculator 222 may receive indirect feedback from the sensor(s) 104 in the form of monitored data, captured during a specific handover action, as is described in more detail with respect to at least FIG. 5. With reference to the example discussed at blocks 302, 304, 306, 308, and 310, the affordance calculator may receive via an input device(s) direct feedback of the handover action from the user 130. The feedback may include that the steel box was placed too far away for the user 130 to reach the steel box without moving. The affordance calculator 222 may use this feedback to update a distance value in the preference model such that in future actions, the affordance calculator places the steel box closer to the user 130 than the steel box was placed in this handover action.

Figure 4A:
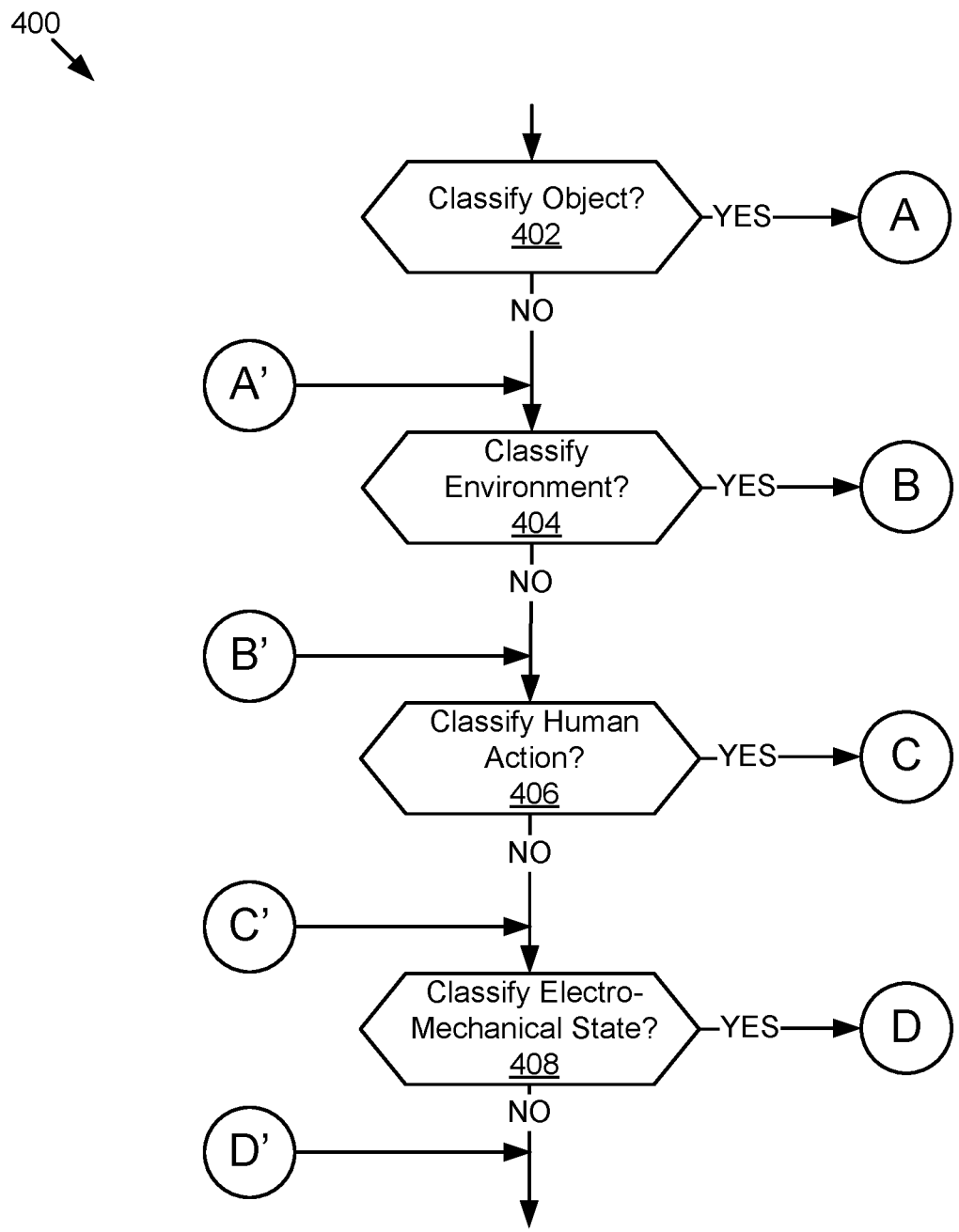
FIGS. 4A-4E are flowcharts of example methods of classifying data.

FIGS. 4A-4E are flowcharts of an example method 400 for using perceptual classifier(s). In some implementations, the operations in the method 400 may reflect various operations executable under block 304 of FIG. 3. In FIG. 4A, the perceptual classifier 224 estimates probabilities of different classifications. At block 402, the object classifier 250 determines whether to classify an object. If so, the object classifier 250 processes object data from the sensor data, and estimates the probabilities of an object belonging to different classifications as described below with reference to FIG. 4B. At block 404, the environment classifier 252 determines whether to classify an environment. If so, the environment classifier 252 processes environment data from the sensor data, and estimates the probabilities of an environment belonging to different classifications as described below with reference to FIG. 4C. At block 406, the human action classifier 254 determines whether to classify a human action. If so, the human action classifier 254 processes human action data from the sensor data, and estimates the probabilities of a human action belonging to different classifications as described below with reference to FIG. 4D. At block 408, the electro-mechanical state classifier 256 determines whether to classify a state. If so, the elector-mechanical state classifier 256 processes state data from the sensor data, and estimates the probabilities of a state belonging to different classifications as described below with reference to FIG. 4E. In some implementations, the method 304 may include all of the classifications described above, whereas in other implementations, 304 may use a single classification or a combination of classifications to estimate probabilities.

Figure 4B:
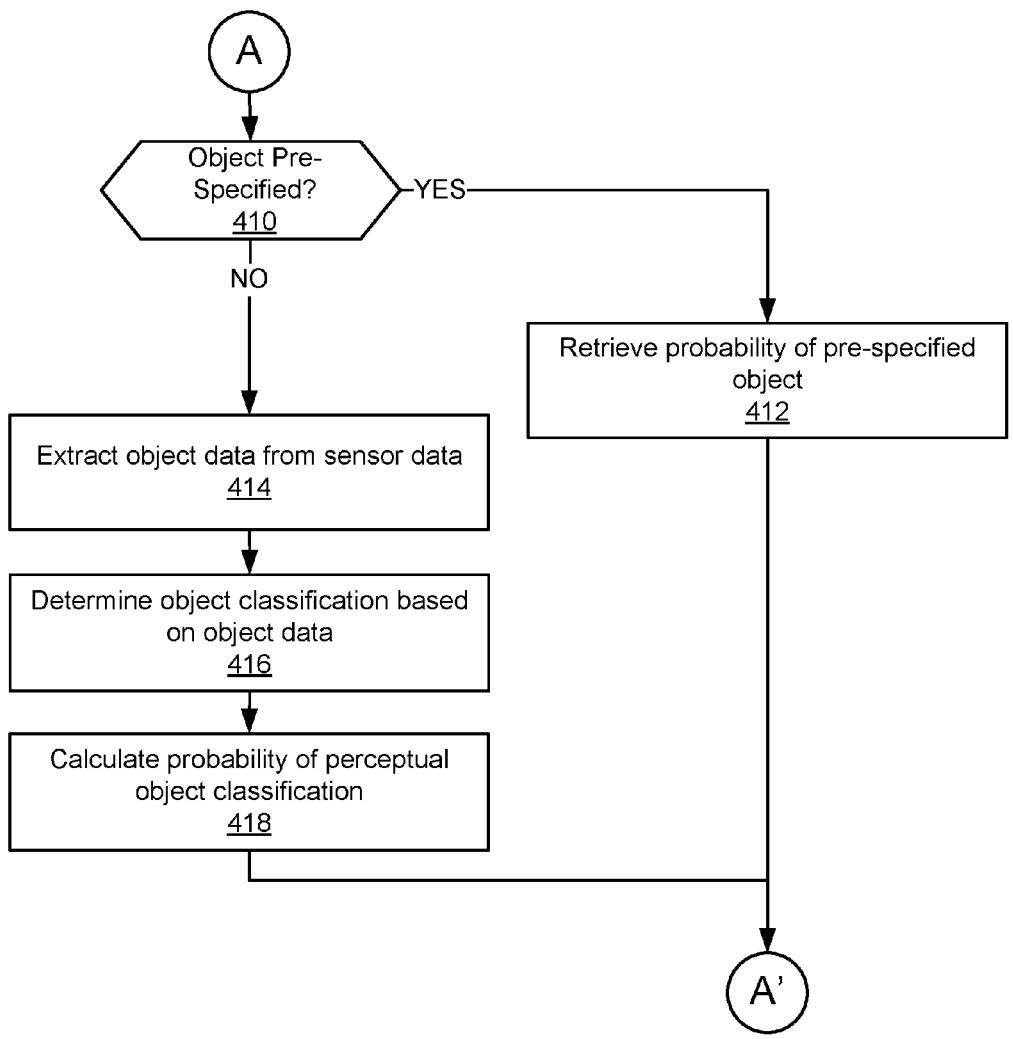

With reference to FIG. 4B, at block 410, the object classifier 250 determines if the object is pre-specified. For example, the robot unit 102 may be pre-programmed to pick up balls and hand them off to a user 130. To speed up the process, the certain classes of balls may be pre-specified so that those balls may be immediately identified by the object classifier 150 without having to compare probabilities between different classes of balls. At block 412, if the object is determined to be pre-specified in block 410, the object classifier 250 retrieves a probability of the pre-specified object. The probability of the pre-specified object may be used by the object handover engine 108 for further processing as discussed elsewhere herein.

At block 414, if the object classifier 250 determines that the object was not pre-specified in block 410, the object classifier 250 extracts object data from the sensor data. The object data may include any data that may be used to determine a type of object, such as physical characteristics, weight, shape, location, coloration, texture, quantity, packaging, etc., of the object. In some implementations, the object may already be controlled by the robot unit 102. The sensors(s) 104 in the appendage of the robot unit 102 and/or directed toward the object and/or configured to sense aspects related to the object being held may be used to determine the characteristics the object. In further implementations, the robot unit 102 may use sensor(s) 104 to capture information related to an object before the robot unit 102 takes control of the object.

At block 416, the object classifier 250 may determine classification(s) for the object and corresponding probability(ies) for those classification(s) based on the object data. For example, the object classifier 250 may determine using the sensor data that the traits of the object are lightweight and spherical. Based on these traits, the object classifier 250 may classify the object as a ball within a certain probability.

At block 418, the object classifier 250 may estimate a probability(ies) of the object belonging to the object classification(s) determined in block 418. The object classifier 250 may calculate probability(ies) of different object classification(s) occurring given the object data and use the probability(ies) to determine overall probability(ies). In some implementations, the object classifier 250 may determine applicable classifications and probabilities for the object by comparing the object data with data models 214 stored in the storage device 212. Each of the data models may corresponding to a given classification and may include various parameters, such as object traits (e.g., size, shape, color, weight, use, etc.), and the object classifier 250 may compare the traits determined about the object being manipulated with the parameters of the data models, and calculate how well they match. In further implementations, the probability(ies) of each object trait may be scalar in nature (e.g., a percentage), a binary value, (e.g. true or false), etc.

Figure 4C:
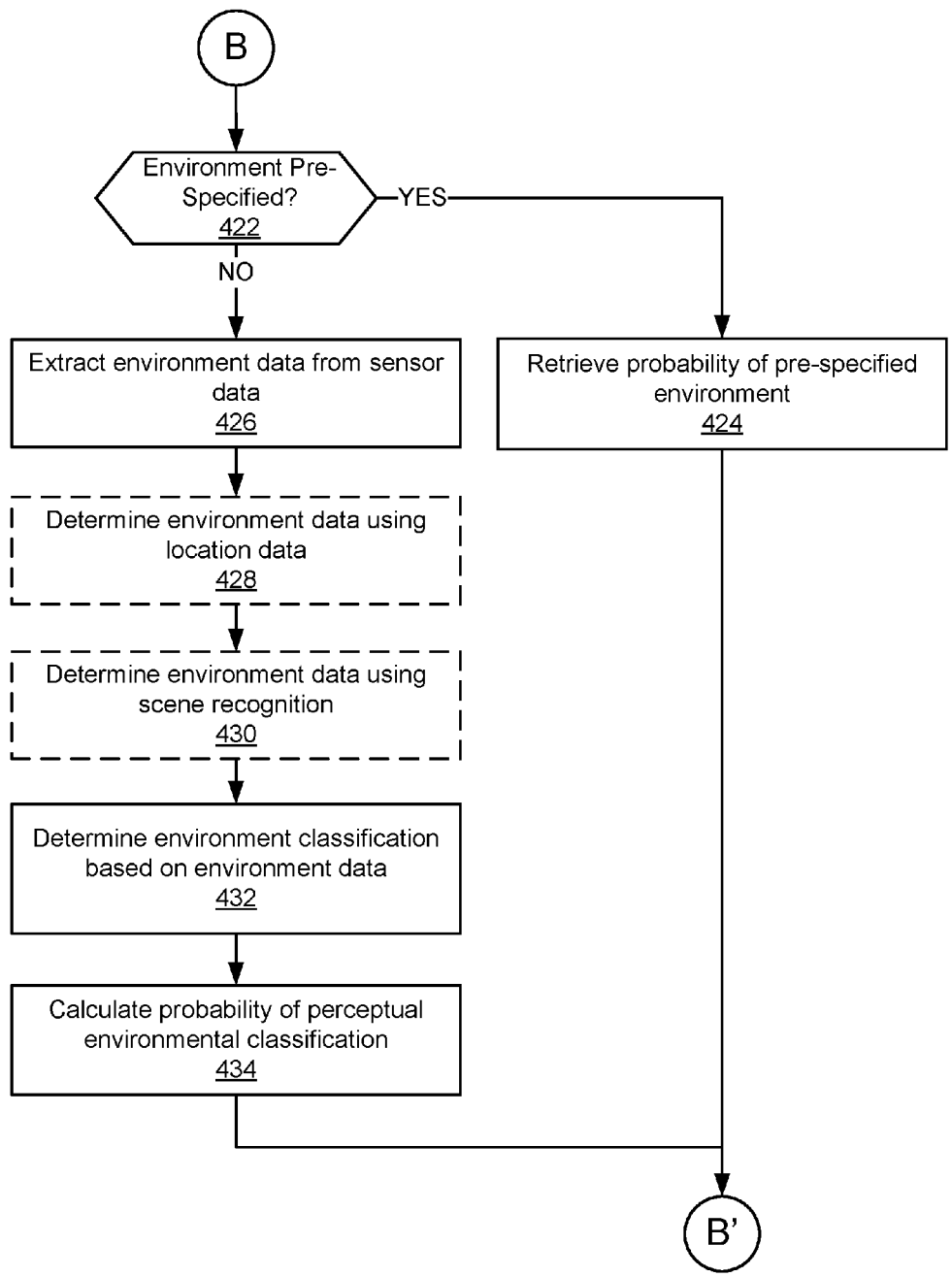

With reference to FIG. 4C, at block 422, the environment classifier 252 determines if the environment is pre-specified. For example, the robot unit 102 may be pre-programmed to operate in a kitchen. To speed up the process, the information relating to the kitchen environment may be pre-specified so that the kitchen may be identified by the environment classifier 252 without having to compare probabilities between different environments. At block 424, if the environment is determined to be pre-specified in block 422, the environment classifier 252 retrieves a probability of the pre-specified environment. The probability of the pre-specified environment may be used by the object handover engine 108 for further processing as discussed elsewhere herein.

At block 426, if the environment classifier 252 determines that the environment was not pre-specified in block 422, the environment classifier 252 extracts environment data from the sensor data. The environment data may include any data that may be used to determine an environment, such as a location, a scene, a determination of open space, geolocation data, etc. The environment data may also include different human activities in the environment for the environment classifier 252 to use when determining the environment. For example, in some implementations, working (a human activity) is more likely to occur in an environment that is designed for working. At block 428, in some implementations, the environment classifier 252 may determine environment data by using location data provide by a location sensor 104 such as a geolocation sensor.

At block 430, in some implementations, the environment classifier 252 may determine environment data using scene analysis. In some implementations, the environment classifier 252 may perform scene recognition by comparing the sensor data with the database of data models 214 and classifying portions of the sensor data based on the comparison. The data models 214 may include pre-recorded data that was previously classified by hand according to different semantic descriptions, and/or classified based on prior iterations of the methods discussed herein (e.g., based on direct and/or indirect feedback). The comparison may include both auditory analysis and/or image analysis. In some implementations, the environment classifier 252 may perform object based scene recognition by identifying types of objects in the sensor data and comparing the types of objects to the data models 214 and classifying the objects in the sensor data based on the comparison. The sensor data may be audio, visual, and/or depth image data. The environment classifier 252 may then determine the type of environment based on the classified objects.

In some implementations, the environment classifier 252 may perform scene analysis using a perceptual map. In this implementation, the environment classifier 252 may use sensor data including real-time scene recognition to create an off-line map that may be queried by the environment classifier 252 in response to a detected person location. This method may filter out some of the noisy perceptual data. In some implementations, the environment classifier 252 may perform scene analysis using a hand-classified map and/or machine-learned map. For instance, a map of the environment may initially be created by a user 130 (e.g., the target user, an administrator, etc.) and the environment classifier 252 may overlay the hand-classified map over architectural drawings to describe the environment. In a further example, the environment classifier 252 may utilize map data that is learned based on previous classifications performed by the system and feedback received based on actions performed using those classifications. Other variations are also possible and contemplated.

At block 432, the environment classifier 252 may determine classification(s) for the environment and corresponding probability(ies) for those classification(s) based on the environment data. For example, the environment classifier 252 may determine using the environment data, a geolocation, scene category probabilities, lighting, temperature, etc., to classify that the location is a laboratory within a certain probability.

In some implementations, the environment classifier 252 may determine applicable classifications(s) and probability(ies) for the environment by comparing the environment data with data models 214 stored in the storage device 212. Each of the data models may correspond to a given classification and may include various parameters, such as environment traits (e.g., geolocation, room traits, furniture models, etc.), and the environment classifier 252 may compare the environment data determine about the environment with the parameters of the data models 214, and calculate probability(ies) of how well they match.

At block 434, the environment classifier 252 may estimate a probability for an environment classification reflecting the actual environment. The environment classifier 252 may estimate a probability of environment(s) occurring given the sensor data and use the probability(ies) to determine overall probability(ies). In some implementations, the probability(ies) of each environment may be scalar in nature (e.g., a percentage), a binary value (e.g. true or false), etc.

Figure 4D:
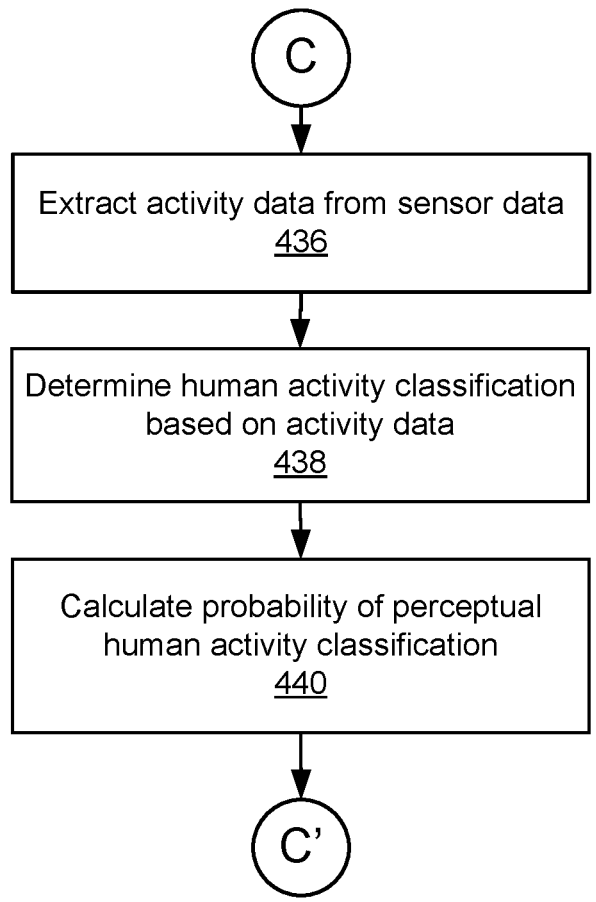

With reference to FIG. 4D, at block 436, the human action classifier 254 extracts activity data from the sensor data provided by the sensor(s) 104. The activity data may including data of the environment, the objects, and one or more users 130 that the object can be handed-off to by the robot unit 102.

At block 438, the human action classifier 254 may determines classification(s) for the human activity and corresponding probability(ies) for those classification(s) based on the activity data. In some implementations, the activity data may be related to a position of the user 130, an action of the user 130, and/or a potential future activity of the user 130. The human action classifier 254 may compare the human activity to a database of recognized activities in the data models 214. Each of the data models 214 may correspond to a given classification and may include various parameters, such as user 130 position, user 130 activity, other users 130 present, etc.), and the human action classifier 254 may compare the activity data with the parameters of the data models 214, and calculate probability(ies) of how well each match.

At block 440, the human action classifier 254 may identify a probability of the human activity classification(s) based on the comparison. In further implementations, the human action classifier 254 may use an effort determination to determine the human activity classification(s). The human action classifier 254 may identify potential actions based on the position of the user 130 and determine an effort level required by the user 130 to complete the different potential actions. For example, if a user 130 is standing, the effort level may indicate that the user 130 should meet the robot unit 102 where the trajectories of the user 130 and the robot unit 102 intersect. The human action classifier 254 estimates the probability(ies) of an activity occurring given the set of sensed data. In further implementations, the probability(ies) of each human action may be scalar in a nature (e.g., a percentage), a binary value (e.g. true or false), etc.

Figure 4E:
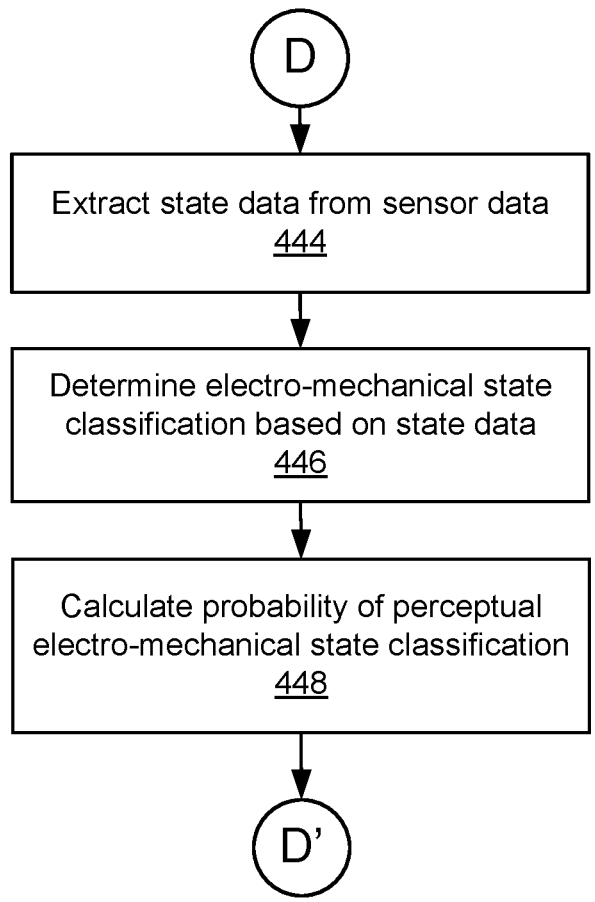

With reference to FIG. 4E, at block 444, the electro-mechanical state classifier 256 extracts state data from the sensor data provided by the sensor(s) 104. The state data may include any data that may be used to determine a state of the robot unit 102, such as battery levels, actuator 114 capabilities in the environment, and/or previous handoff action performances, etc. The state data may be captured by internal sensors(s) 104 monitoring the state of the robot unit 102 and/or external sensor(s) 104 monitoring the surroundings.

At block 446, the electro-mechanical state classifier 256 may determine classification(s) for the electro-mechanical state and corresponding probability(ies) for those classification(s) based on the state data. In some implementations, the electro-mechanical state classifier 256 may use the state data to identify potentially executable operations and determine how well the robot unit 102 would perform the potentially executable operations based on the conditions detected by the sensor(s) 104. In some implementations, the electro-mechanical state classifier 256 may also use state data related to the operational state of the robot unit 102 in order to determine a physical state of the robot unit 102. The physical state may include a power level, a type of actuator 114, a movement capability, a physical size, etc. The electro-mechanical state classifier 256 may incorporate the physical state(s) into the process of identifying potentially executable operations.

At block 448, the electro-mechanical state classifier 256 may estimate probability(ies) of the electro-mechanical state belonging to the electro-mechanical state classification(s). In some implementations, the electro-mechanical state classifier 256 may determine the probability(ies) using an estimator. The estimator may determine the performance of the robot unit 102 performing a handoff operation. The estimator may be implemented in a number of ways. In some implementations, the estimator determines an estimate of poor/neutral/good performance for a potential handoff operation. In some implementations, the estimator may be an expert system created from laboratory testing conditions. In further implementations, the estimator may be learned online in response to performance inside a home or other environment of a user 130. Other suitable variations are also possible and contemplated.

Figure 5:
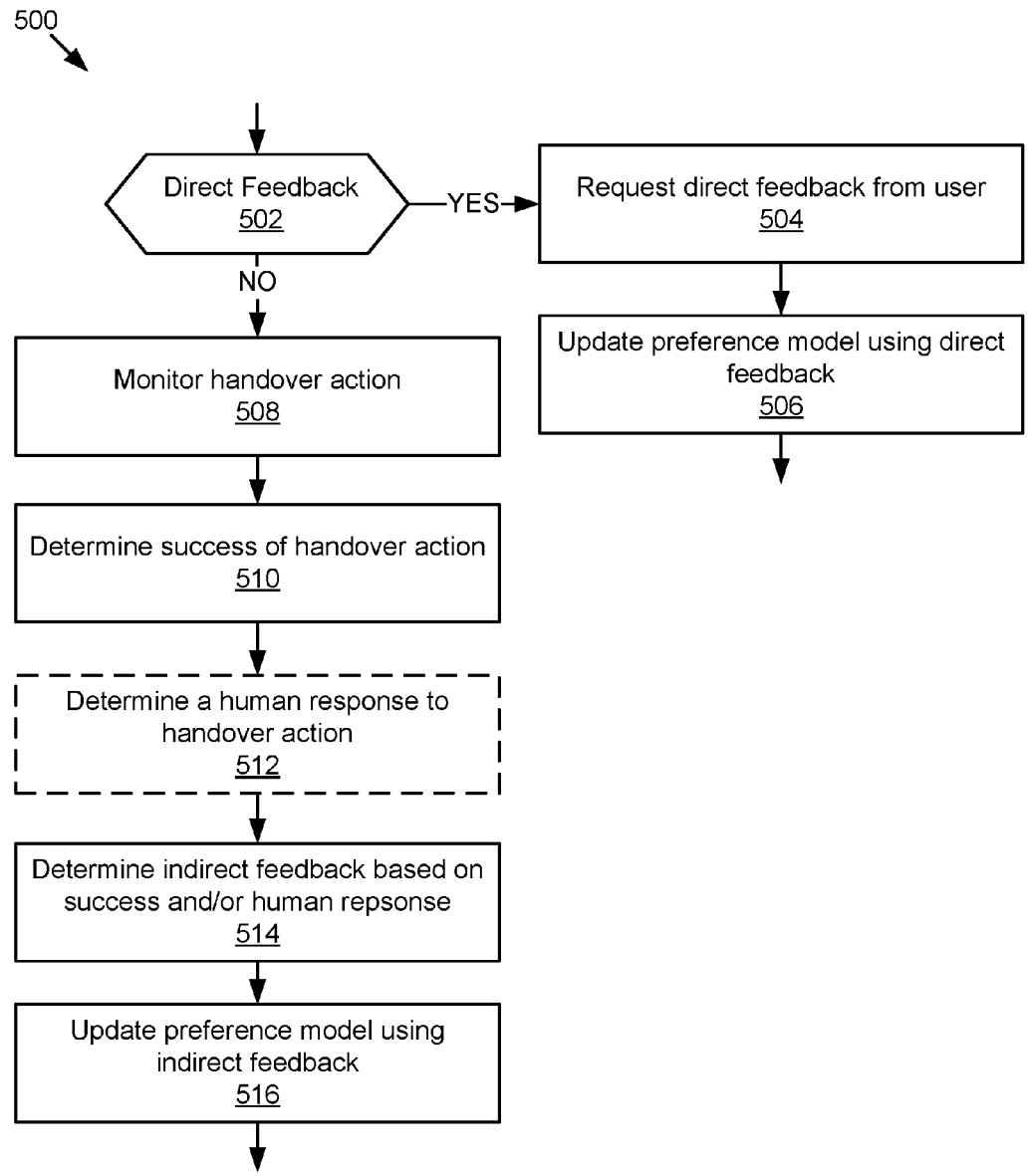
FIG. 5 is a flowchart of an example method for providing feedback to a preference model.

FIG. 5 is a flowchart of an example method 312 for providing feedback to the preference model. In some implementations, the operations in the method 500 may reflect various operations executable under block 312 of FIG. 3. At block 502, the affordance calculator 222 determines whether to request direct feedback after the action renderer 220 executes the handoff action. The affordance calculator 22 may request direct feedback based on an input received from the user 130. At block 504, the affordance calculator 222 requests direct feedback from the user 103. In some implementations, the direct feedback may be in the form of a questionnaire, a request for a rating, a verbal question, or another type of feedback that the user 103 may be able to provide related to the handoff action. The feedback may be captured via a client device of the user and/or one or more input devices associated with the robot unit 102 in some cases, although other suitable variations are also possible and contemplated.

At block 506, the affordance calculator 222 may update the preference model using the direct feedback. In some implementations, the affordance calculator 222 may use the direct feedback and update the affordance values of the preference model. For example, the action renderer 220 may execute a handoff action to move to a user 130 location and hand a ball to the user 130. The user 130 may comment after the handover action that the robot unit 102 did not place the ball in the empty hand of the user 130. The affordance calculator 222 may take the direct feedback from the user 130 and update the preference model such that on a subsequent handoff action using the ball, the robot unit 102 will first determine an empty hand of the user 130 and direct the handoff action to the empty hand.

At block 508, in response to the affordance calculator 222 determining that direct feedback will not be requested, the affordance calculator 222 monitors the handoff action executed by the action renderer 220. In some implementations, the affordance calculator 222 automatically monitors the handoff actions, whether or not direct feedback will be requested. The affordance calculator 222 may monitor the handoff action by using the sensor(s) 104 to capture information about the surroundings and performance/operational state of the robot unit 102 during the handoff action.

At block 510, the affordance calculator 222 may determine a success of the handoff action. In some implementations, success may be identified as whether or not the robot unit 102 completed the handoff action, or in further implementations, the affordance calculator 222 may monitor deviations from the handoff action and may track the deviations and determine success based on the deviations not exceeding a threshold value.

At block 512, in some implementations, the affordance calculator 222 may determine a human response to the handover action. The affordance calculator 222 may determine the human response using the monitored data. For example, the sensor(s) 104 may capture an expression (e.g., smile) on a user's 130 face (e.g., by performing expression recognition using standard techniques on image data depicting the user and captured by sensor(s) 104), and the affordance calculator 222 may determine based on the expression that the user 130 was satisfied or unsatisfied with the performance of the robot unit 102 during the execution of the handoff action. The data models 214 may include various human responses that the affordance calculator 222 may use to determine a success of the handoff action using the human response of the user 130.

At block 514, the affordance calculator 222 may determine indirect feedback based on the success and/or human response. For example, if the affordance calculator 222 determined that the handoff action was unsuccessful because the robot unit 102 was unable to navigate a narrow room to pass an object to the user 130, then the affordance calculator 222 may determine a different response in the preference model for a subsequent handoff action in that room. For example, the preference model may change a value for having the robot unit 102 move in a narrow room and rank a handoff action where the robot unit 102 waits for a user 130 higher in the preference model. By using direct and indirect feedback, the affordance calculator 222 may be able to learn individual user 130 preferences enabling customization of affordance values for specific users 130.

With reference again to FIG. 6, the classifiers 604 may be utilized piecemeal to make handover action 606 decisions. By integrating multiple classifiers 604 into the same handover action 606 decision, the robot unit 102 is capable of making more refined handover actions 606. In some implementations, the handover system 600 may use a preference model based on a generic population, or in alternative implementation, the handover system 600 may use the preference model based on a generic population as a default model and may individualize the preference model based on direct and indirect feedback from a specific user 130.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for executing a handover action, the method comprising:
   receiving, using one or more computer processors, sensor data from one or more sensors coupled to a robot unit, the sensor data describing one or more of surroundings of the robot unit and an object manipulated by the robot unit;
   calculating, using the one or more computer processors, a probability of a perceptual classification related to one or more of the robot unit, a human action, an environment, an electro-mechanical state based on the sensor data;
   calculating, using the one or more computer processors, an affordance based on the probability of the perceptual classification using a preference model;
   determining, using the one or more computer processors, a handover action based on the affordance;
   executing, using the one or more computer processors, the handover action; and
   updating, using the one or more computer processors, the preference model based on feedback.

2. A computer-implemented method for executing a handover action, the method comprising:
   receiving, using one or more computer processors, sensor data from one or more sensors;
   calculating, using the one or more computer processors, a probability of a perceptual classification based on the sensor data;
   calculating, using the one or more computer processors, an affordance based on the probability of the perceptual classification using a preference model;
   determining, using the one or more computer processors, a handover action based on the affordance;
   executing, using the one or more computer processors, the handover action; and
   updating, using the one or more computer processors, the preference model based on feedback.

3. The method of claim 2, wherein calculating the probability of the perceptual classification further comprises:
   extracting, using the one or more processors, object data from the sensor data;
   determining, using the one or more processors, an object classification based on the object data; and
   calculating, using the one or more processors, the probability of the perceptual classification using the object classification.

4. The method of claim 2, wherein calculating the probability of the perceptual classification further comprises:
   extracting, using the one or more processors, environment data from the sensor data;
   determining, using the one or more processors, an environment classification based on the environment data; and
   calculating, using the one or more processors, the probability of the perceptual classification using the environment classification.

5. The method of claim 4, wherein the environment data is a geolocation.

6. The method of claim 2, wherein calculating the probability of the perceptual classification further comprises:

extracting, using the one or more processors, activity data from the sensor data;
determining, using the one or more processors, a human activity classification based on the activity data; and
calculating, using the one or more processors, the probability of the perceptual classification using the human activity classification.

7. The method of claim 2, wherein calculating the probability of the perceptual classification further comprises:
extracting, using the one or more processors, state data from the sensor data;
determining, using the one or more processors, an electro-mechanical state classification based on the state data; and
calculating, using the one or more processors, the probability of the perceptual classification using the electro-mechanical state classification.

8. The method of claim 2, wherein updating the preference model based on the feedback further comprises:
monitoring, using the one or more processors, the executed handover action;
determining, using the one or more processors, a success of the handover action;
determining, using the one or more processors, an indirect feedback based on the success; and
updating, using the one or more processors, the preference model using the indirect feedback.

9. The method of claim 2, wherein updating the preference model based on the feedback further comprises:
requesting, using the one or more processors, a direct feedback from a user; and
updating, using the one or more processors, the preference model using the direct feedback.

10. The method of claim 2, wherein calculating the probability of the perceptual classification based on the sensor data includes calculating a first probability for an object classification, calculating a second probability for a human activity, calculating a third probability for an environment, and calculating a fourth probability for an electro-mechanical state classification, and calculating the affordance based on the first probability, the second probability, the third probability, and the fourth probability.

11. A system comprising:
one or more computer processors; and
one or more memories storing instructions that, when executed by the one or more processors, cause the system to perform operations including:
receive sensor data from a sensor, the sensor data describing surroundings;
calculate a probability of a perceptual classification based on the sensor data;
calculate an affordance of the probability of the perceptual classification based on a preference model;
determine a handover action based on the affordance;
execute the handover action; and
updating the preference model based on feedback.

12. The system of claim 11, wherein the instructions to calculate the probability of the perceptual classification further include:
extract object data from the sensor data;
determine an object classification based on the object data; and
calculate the probability of the perceptual classification using the object classification.

13. The system of claim 11, wherein the instructions to calculate the probability of the perceptual classification further include:
extract environment data from the sensor data;
determine an environment classification based on the environment data; and
calculate the probability of the perceptual classification using the environment classification.

14. The system of claim 13, wherein the environment data is a geolocation.

15. The system of claim 11, wherein the instructions to calculate the probability of the perceptual classification further include:
extract activity data from the sensor data;
determine a human activity classification based on the activity data; and
calculate the probability of the perceptual classification using the human activity classification.

16. The system of claim 11, wherein the instructions to calculate the probability of the perceptual classification further include:
extract state data from the sensor data;
determine an electro-mechanical state classification based on the state data; and
calculate the probability of the perceptual classification using the electro-mechanical state classification.

17. The system of claim 11, wherein the instruction to update the preference model based on the feedback further include:
monitor the executed handover action;
determine a success of the handover action;
determine an indirect feedback based on the success; and
update the preference model using the indirect feedback.

18. The system of claim 11, wherein the instructions to update the preference model based on the feedback further include:
request a direct feedback from a user; and
update the preference model using the direct feedback.

19. The system of claim 11, wherein calculating the probability of the perceptual classification based on the sensor data includes calculating a first probability for an object classification, calculating a second probability for a human activity, calculating a third probability for an environment, and calculating a fourth probability for an electro-mechanical state classification, and calculating the affordance based on the first probability, the second probability, the third probability, and the fourth probability.

* * * * *